United States Patent [19]

Imamura et al.

[11] Patent Number: 4,933,716
[45] Date of Patent: Jun. 12, 1990

[54] FILM CARRIER

[75] Inventors: Takasi Imamura, Kanagawa; Tetsuo Morita; Takashi Nagashima, both of Saitama, all of Japan

[73] Assignee: Fuji Photo Film Co., Ltd., Kanagawa, Japan

[21] Appl. No.: 370,972

[22] Filed: Jun. 26, 1989

[30] Foreign Application Priority Data

Jun. 27, 1988 [JP] Japan .................................. 63-159014

[51] Int. Cl.$^5$ .............................................. G03B 27/62
[52] U.S. Cl. ........................................... 355/75; 355/41
[58] Field of Search ............................... 355/75, 40, 41

[56] References Cited

U.S. PATENT DOCUMENTS 4,189,228  2/1980  Farrell .................................... 355/41
4,736,228  4/1988  Ito .......................................... 355/75

Primary Examiner—Monroe H. Hayes
Attorney, Agent, or Firm—Sughrue, Mion, Zinn, Macpeak & Seas

[57] ABSTRACT

A negative film carrier for driving a negative film in a longitudinal direction of the negative film to convey the film to a printing position, is provided with a bar code reading mechanism. In the mechanism a light emitting element on one for illuminating the bar code is disposed to face one side surface of the film, and a light receiving element is disposed to face the other side surface thereof. These elements are mutually separated when the film is inserted between them in the widthwise direction of the film at the printing position. At the time of film transporting condition these elements are linked together to unitedly move and follow the edge of the film so as to accurately coincide with the bar code.

20 Claims, 12 Drawing Sheets

FILM CARRIER

The present invention relates to a film carrier used for printing an image of a film onto a light sensitive material.

DESCRIPTION OF THE RELATED ART

Generally, a film carrier is used for printing an image of a negative film developed on a photographic paper.

Among the various types of film carriers there is a proposal (Japanese Utility Model Application Laid Open No. 63-336) wherein, not only a long film with many frames but also a short film cut into lengths of 4 to 7 frames can be disposed promptly to a print optical axis. In this film carrier, the negative film can be moved not only in its longitudinal direction but also in its width direction to be positioned on the optical axis, so that quick operation will be possible.

However, since this film carrier is constituted such that the film be moved in the width direction and is conveyed on a transport path of the film, if a light emitting device and a light device apparatus for reading a bar code is arranged to correspond to both side surfaces of the film, the light emitting device and the light receiving device must be separated from each other in order to insert the film therebetween. Accordingly, if these light emitting device and light receiving device are arranged so as to be movable in film width direction for causing them to correspond to the bar code formed at a fixed distance from one side edge of the film, they are moved separately in the film width direction to be out of alignment with each other, resulting in a bar code reading error.

SUMMARY OF THE INVENTION

In view of the above problem, an object of the present invention is to provide a film carrier in which not only a film can be inserted easily in a transport path of the film but also a bar code on a film can be read precisely.

A film carrier according to the present invention is applied for transporting a film marked with a bar code to an optional position and is provided with; a pair of rollers for gripping and transporting the film, which can be mutually separated at the time of insertion of the film between the pair of rollers; a light emitting device for illuminating the bar code, arranged to face on one side surface of the film that is to be transported; a light receiving device for reading the bar code by light received from the light emitting device, disposed to face on the other side surface of the film; an opening and closing device for enabling the film to be inserted between the light emitting device and the light receiving device which are mutually separated at the time of inserting the film between the pair of rollers; a guide device for causing one of the light emitting device and the light receiving device to follow the bar code; and a linking device for moving the light emitting device and the light receiving device together in the film widthwise direction at the time of transport of the film, whereby the light emitting device and the light receiving device are mutually opposed and aligned accurately with the bar code.

Consequently, in the above arrangement, when the opening and closing device is closed and the film is put in a conveyable situation, the light emitting device and the light receiving device are linked together by the linking device and moved in the film widthwise direction.

Accordingly, by the guide apparatus, the light emitting device and the light receiving device are coaxially positioned at a predetermined position from the side edge of the film, thereby improving the accuracy of reading the bar code.

For the linking apparatus, a positioning pin and a hole into which the positioning pin is inserted, or a magnetic attractive force can be used.

DETAILED DESCRIPTION OF THE PREFERRED EMBODIMENTS

Figure 1:
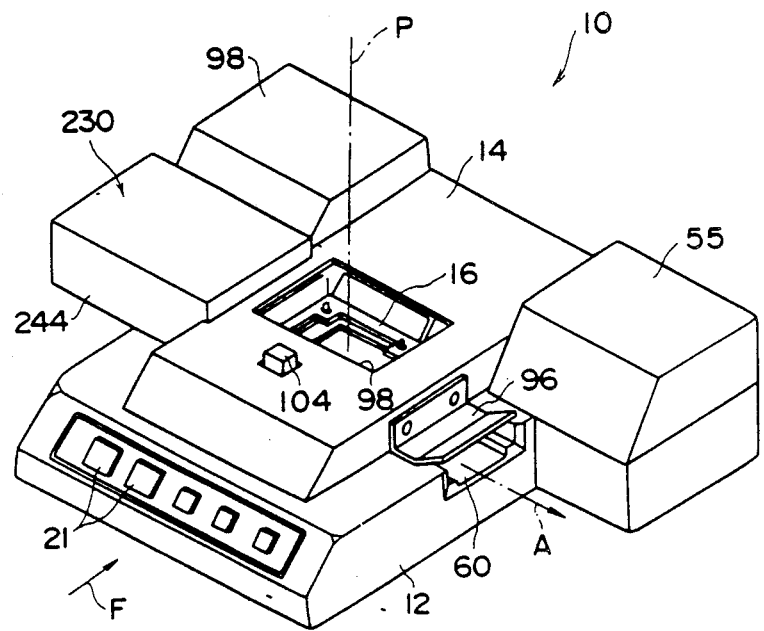
FIG. 1 is a perspective view of a film carrier of a first embodiment of the present invention.

As shown in FIGS. 1-9, a film carrier 10 of a first embodiment of the present invention is constituted such that an opening and closing arm 14 and an upper mask holder 16 constituting an opening and closing means are rotatably operated against a fixedly arranged base member 12 to be opened therefrom and a negative film 18 is led between the opening and closing means and the base member 12 either in a widthwise direction of the negative film 18 (in a direction of arrow F) or a longitudinal direction of the negative film 18, so that the negative film 18 can be caused to correspond to a printing position on a film transport path A and on an optical axis P. Below is a description of the construction of each of the above mentioned components.

The Base Member 12 and Its Related Components

The base member 12 is mounted on a fixed plate 20 so as to cover the fixed plate 20 (see FIGS. 5 and FIG. 6) attached to a photographic printing apparatus (not shown in the drawings) and has operational buttons 21 arranged on its front face.

Figure 4:
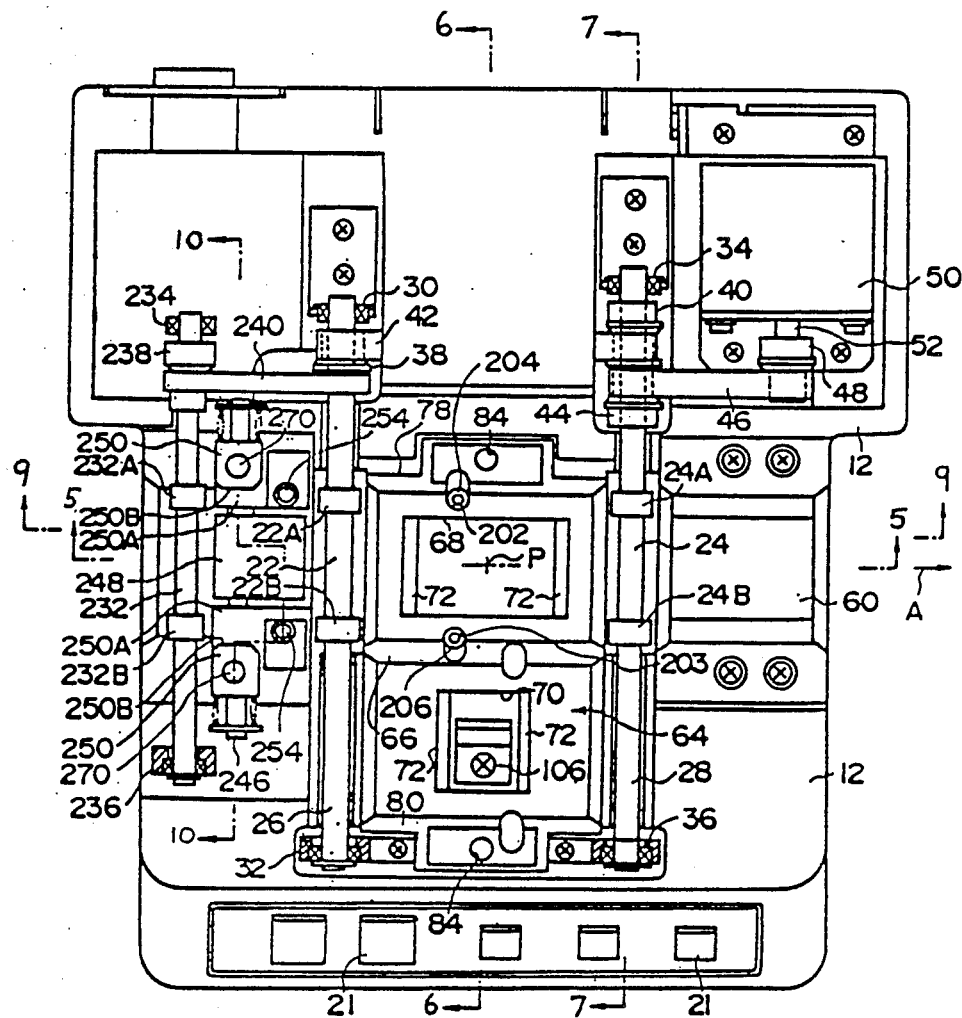
FIG. 4 is a plan view of the film carrier in which an open and close arm and an upper mask holder etc. are removed.
Figure 8:
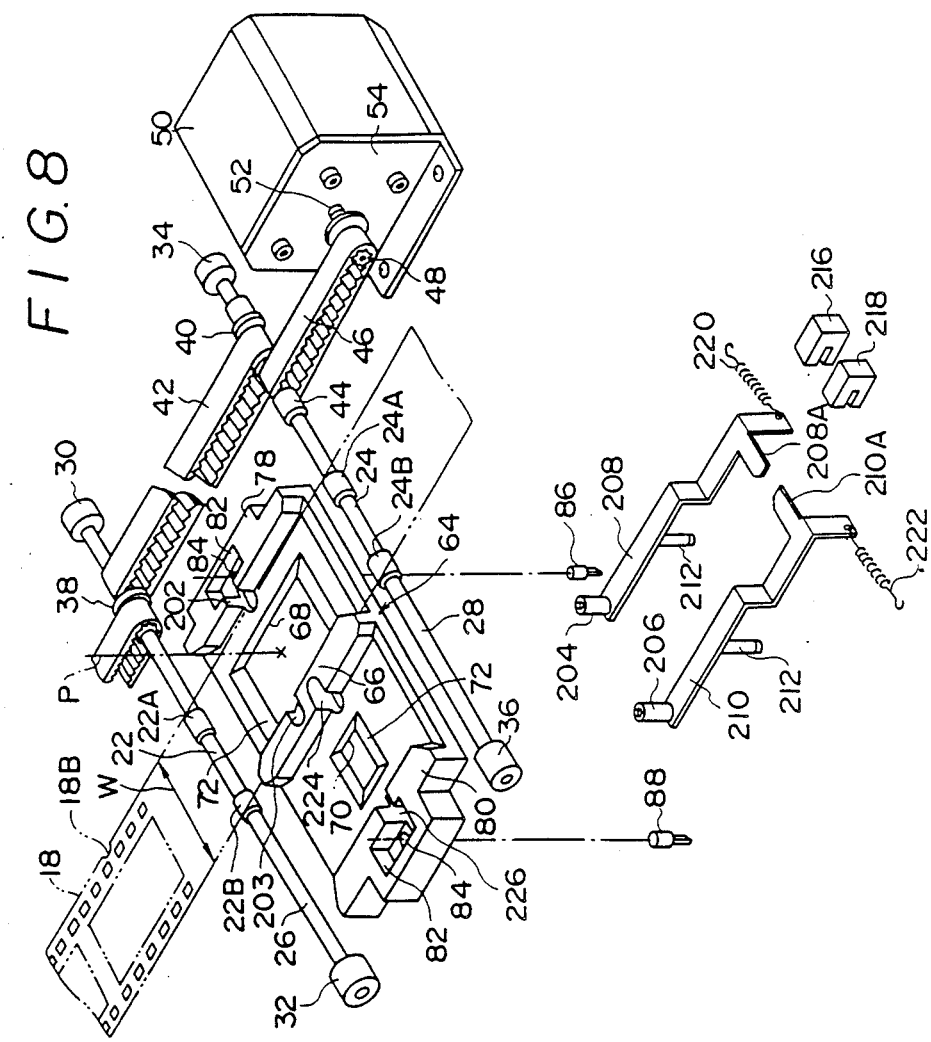
FIG. 8 is an exploded perspective view showing the relation between conveying rollers and a lower mask of this embodiment.

As shown in FIGS. 4 and 8, conveying rollers 22 and 24 are disposed respectively at the upstream and downstream sides of the optical axis P, and arranged so as to correspond with a back face (lower side) of the negative film 18 being conveyed. These conveying rollers 22, 24 are provided with large diameter contact sections 22A, 22B and 24A, 24B for contacting both edge regions of the film 18.

The conveying rollers 22, 24 are fixed to respective rotating shafts 26, 28 and are arranged to be at right angles (in plan view) to the film transport path A. The length of each of the rotating shafts 26, 28 is relatively larger than the length W (see FIG. 8) of each of the conveying rollers 22, 24. The rotating shaft 26 is rotatably supported at its inside and outside ends to the base member 12 by means of bearings 30 and 32 respectively, and the rotating shaft 28 is rotatably supported at its inside and outside ends to the base 12 by means of bearings 34 and 36, respectively.

Between the bearing 30 and the conveying roller 22 a pulley 38 is fixed on the rotating shaft 26, and between the bearing 34 and the conveying roller 24 a pulley 40 is fixed on the rotating shaft 28. Between these pulleys 38 and 40 is wrapped a timing belt 42. In this way the rotating shafts 26 and 28 are rotated synchronously with the same rotational speed and in the same direction viewed along their axes.

Between pulley 40 and conveying roller 24 is fixed a pulley 44 with one part of a timing belt 46 wrapped around it. Another part of the timing belt 46 is wrapped around a pulley 48 which is connected to an output shaft 52 of a motor 50. The motor 50 is supported by the base member 12 by means of a bracket 54

Figure 5:
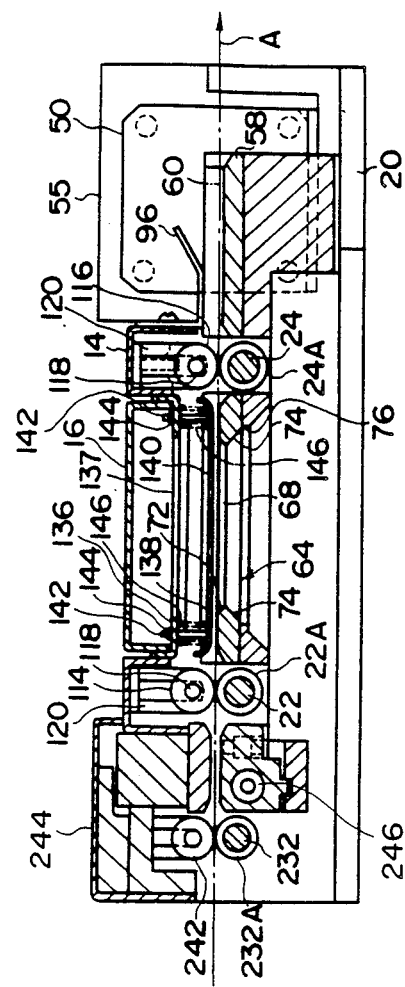
FIG. 5 is a sectional view taken in the direction of line V—V of FIG. 4.

Consequently, a rotational force from the motor 50 is transmitted to the rotating shafts 26 and 28 by means of the timing belts 46 and 42 to rotate the conveying rollers 22 and 24 in the clockwise direction in the case of the view in FIG. 5, and a conveying force is given Lo the negative film 18 on the film transport path A.

The motor 50 is covered by a motor cover 55 (see FIGS. 1 to 3) attached to the base member 12.

Downstream of the conveying roller 22 is formed a channel 60 with a width corresponding to the width of the negative film 18, to guide the negative film 18 which is fed from the print position.

Low Mask 64 and Its Related Parts

As shown in FIG. 5, a lower mask 64 is mounted in the base member 12 below the transport path A. This mask 64, as shown in FIG. 8, is constituted by a thin plate, and it is formed with a first mask opening 68 and a second mask opening 70 on both sides of a guide wall 66 standingly provided in a center area of the mask 64.

In a typical case, the first mask opening 68 corresponds to the size of a regular size (26×36 mm) film image, while the second mask opening 70 corresponds to the size of a half size (18×24 mm) film image.

Upstream and downstream of the first mask opening 68 and the second mask opening 70 is a beveled surface 72 to prevent the film 18 from catching. On the back side of this beveled surface 72 is a beveled surface 74 with an opposite slope (see FIG. 5) formed. An opening 76 having a width and a breadth corresponding to the width and breadth of the beveled surface 74 is formed in the base member 12.

To both longitudinal edges of the lower mask 64 are standingly provided guide walls 78 and 80. These guide walls 78 and 80 and guide wall 66 form a film guide channel between them. In these guide walls 78 and 80 are formed rectangular recess 82 and in the center of these recesses 82 are fixed magnets to hold positioning pins 86 and 88.

Round holes 84 are pierced through the lower mask 64 from the bottom faces of the rectangular recesses 82 to the other side. Both these round holes 84 are to take the positioning pins 86, 88 standing up from the base member 12. That is to say, when the lower mask 64 is lifted up from the condition shown in FIG. 4, and it is removed from the positioning pins 86, 88. After the lower mask 64 is turned a half turn about the guide wall 66, reinserting the positioning pins 86, 88 are reinserted in the respective holes 84 results in the second mask opening 70 coinciding with the optical axis P.

Figure 6:
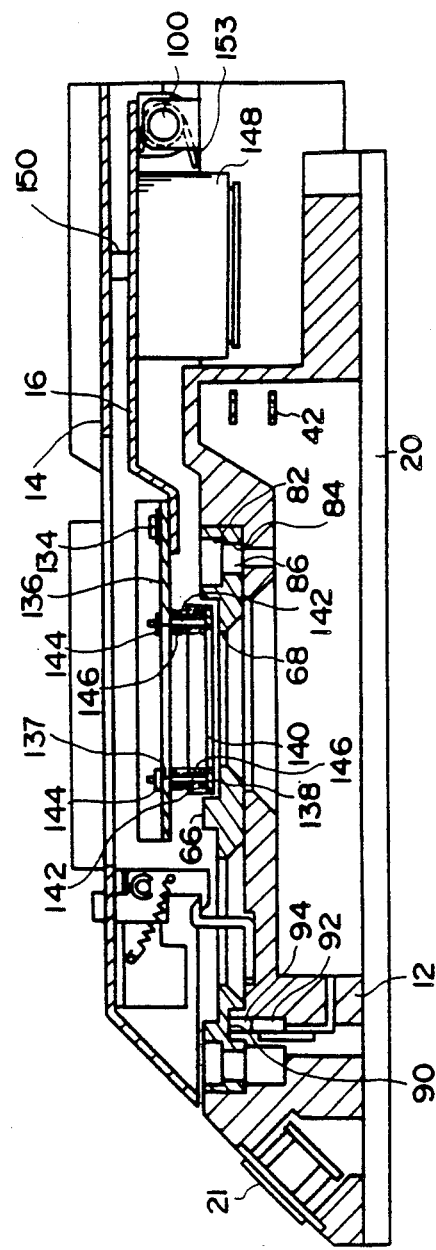
FIG. 6 is a sectional view taken along a line VI—VI of FIG. 4.

At this time, as shown in FIG. 6, a recess 90 is provided in the back face of lower mask 64 close to the second mask opening 70, and a detector arm 94 of a limit switch 92 is provided in the base member 12 coinciding with this recess 90. When the first mask opening 68 coincides with the optical axis P, the detector arm 94 goes into this recess 90. When the lower mask 64 is turned through 90°, the second mask opening 70 coincides with the optical axis P and the lower mask bottom face pushes against the detector arm 4 of the limit switch 92. Consequently this 90° turned position is detected.

As shown in FIGS. 4 and 8, in the condition that the first mask opening 68 is arranged between conveying rollers 22 and 24, with its center coaxial with the optical axis P, the second mask opening 70 is arranged between a portion of the rotating shaft 26 positioned between the large diameter section 22B and the bearing 32 and a portion of the rotating shaft 28 positioned between the large diameter section 24B and the bearing 36.

Consequently, the conveying roller 22 and the conveying roller 24 are arranged as close as possible to the first mask opening 68 so as to positively convey the negative film 18.

If the axial length of the rotating shafts 26, 28 is short, with the bearings 32, 36 close to the conveying rollers 22, 24, and the rotating shafts 26, 28 are rotatably supported by the base member 12, then for these bearings 32 and 36 to be adequately separated from the lower mask 64, their location must be moved upstream and downstream from the printing position and an interval between the conveying rollers 22 and 24 must be increased. The present invention solves these undesirable conditions and disadvantages.

Notch Detection Mechanism and Related Elements

As shown in FIGS. 4 and 8, with the lower mask 64 located on the base member 12, a pair of elongated holes 202, 203 are piercingly formed on both sides of the film transport path A, at positions a little up stream of the optical axis. These elongated holes 202, 203 are elongated in the film widthwise direction with one end towards the guide walls 78 and 66 and the other end towards the vicinity of the first mask opening 68.

Into these elongated holes 202, 203 are respectively inserted detector pins 204, 206 constituting a film position detector means, as shown in FIG. 8. These detector pins 204, 206 are fixed to the respective ends of detector levers 208, 210. These detector levers 208, 210 are parallel in the longitudinal direction to the film transport path A, but looking from the direction of the optical axis P (i.e. plan view) they are formed so as not to protrude into the inside of the first mask opening 68, and are arranged so as not to disturb printing. At intermediate portions of these detector levers 208, 210 are fixed pivot pins 212 and the detector levers 208, 210 are rotatably supported by the base member 12 through the bearings 214.

Figure 9:
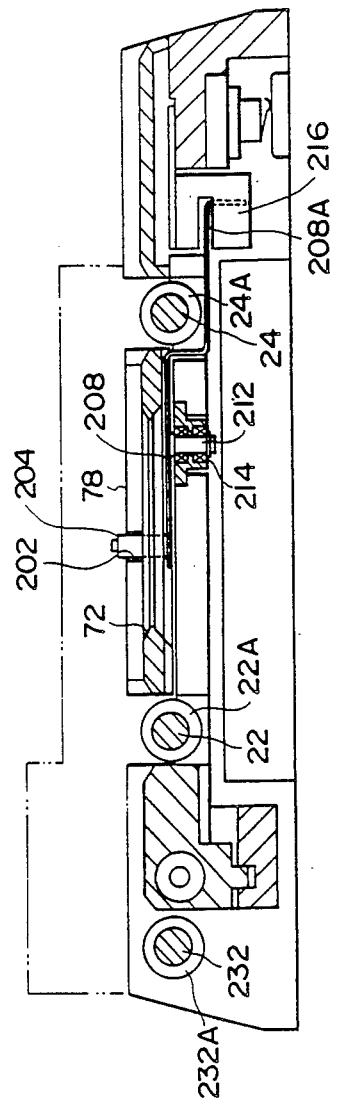
FIG. 9 is a sectional view taken along a line IX—IX of FIG. 4.

Intermediate portions of the detector lever 208, 210 are bent in a step shape away from the sides of the detector pins 204, 206, as shown in FIG. 9, so as not to interfere with the rotating shaft 28, and the ends thereof are again bent to become strikers 208A and 210A. These strikers correspond to sensors 216 and 218 provided on the base member 12, so that the movements of detector levers 208, 210 can be detected.

That is to say, the strikers 208A and 210A are attached to one ends of tension coil springs 220, 222 respectively with the other ends of the springs 220, 222 connected to the base member 12, so that the detector pins 204, 206 are urged into the film transport path A. Consequently, the negative film 18 is conveyed on the transport path A, and by the detector pins going into a notch 18B formed to correspond to the image on the negative film 18, detection is effected.

To explain more definitely, since the notch 18B is formed in a previous step not shown in the drawings to correspond to the central area in the longitudinal direction of an image 18A in the case that the image 18A is an image suitable for printing, then when the detector pin 204 or the detector pin 206 move into the notch 18B and detect the notch, exposure is performed. Since this notch detection is carried out a little upstream from the position of the optical axis P which is at the film stop position, it can be decided whether or not to print the image 18A before it coincides with the optical axis P.

Accordingly, after the detection of the notch 18B with the detector pin 204 or the detector pin 206, since the negative film 18 is stopped after being transported just a little further, it is not necessary to suddenly stop conveying at the notch detector position so that a high speed transport of the negative film 18 is possible. Further, the notch 18B is formed in the negative film 18 with such an accuracy that the displacement of the detector pins 204, 206 from the optical axes in the film transport direction, is greater than the maximum error in the film longitudinal direction. Consequently the notch 18B is always detected at a position before the optical axis P, so it is unnecessary to bring back the negative film 18 after the notch has been detected.

Further, since the detector pins 204, 206 are concerned with the image frame immediately prior to the image frame stopped at the print position, it is only necessary for a control device to memorize the short range (less than the length of a single film frame) from after detection of the notch with these detector pins up until the image stops at the print position. In contrast to this, when the notch detection is performed several frames upstream, then it is necessary to have a large memory capacity to cope with this.

Meanwhile, corresponding to the second mask opening 70, elongated holes 224, 226 are formed in both the guide wall 66 and the guide wall 80. These elongated holes 224 and 226 have the same shape as the elongated holes 202 and 203, and a part of each of the elongated hole 224, 226 is positioned in the film transport path A. Further with these elongated holes 224, 226, as shown in FIG. 4, when the optical axis P coincides with the first mask opening 68, these holes 224, 226 are positioned a little down stream. Consequently, lifting the lower mask 64 in the upward direction of FIG. 8 and turning through 180° to interchange the first mask opening 68 and the second mask opening 70, results in the second mask opening 70 coinciding with the optical axis P and the elongated holes 224, 226 corresponding with the respective detector pins 204, 206. Now using this notch detection mechanism, detection of the longitudinal ends of the film and of the leading image as well as the last image is possible. That is to say, looking at the negative film 18 in FIG. 2, on one side of the image 18A is formed a notch 18B, and on both sides of the leading and tail images and at positions displaced a little in the longitudinal direction of the film are formed the notches 18B. By these notches, when the detector pins 204, 206 are both spread open, the longitudinal edges 18C of the negative film 18 are detected. When either of detector pins 204 or 206 detects the notch 18B, then this indicates an image 18A for printing. If however both the detector pin 204 and detector pin 206 detects the notches 18B in a very short time, then this indicates that the image is of a leading or tail frame.

Open and Close Arm 14 and Its Related Elements

Figure 2:
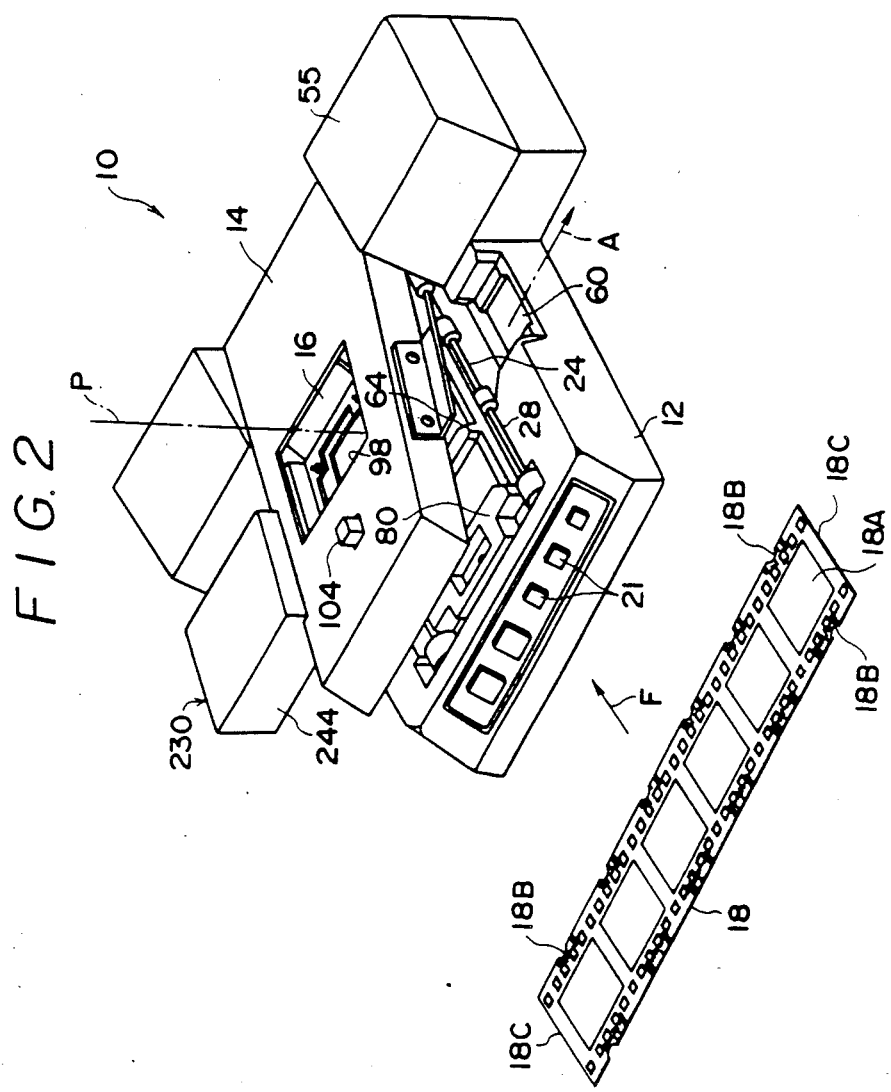
FIG. 2 is a perspective view of the film carrier in an open condition.
Figure 3:
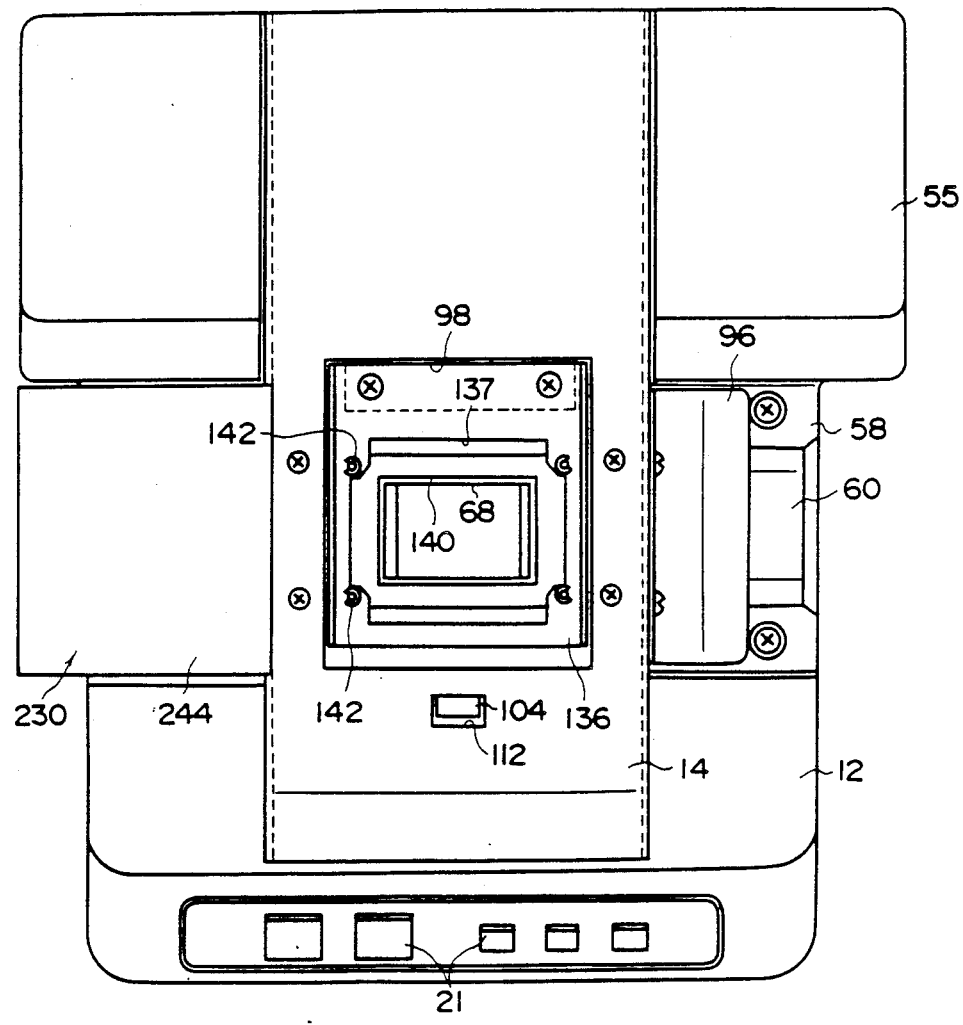
FIG. 3 is a plan view of the film carrier.
Figure 7:
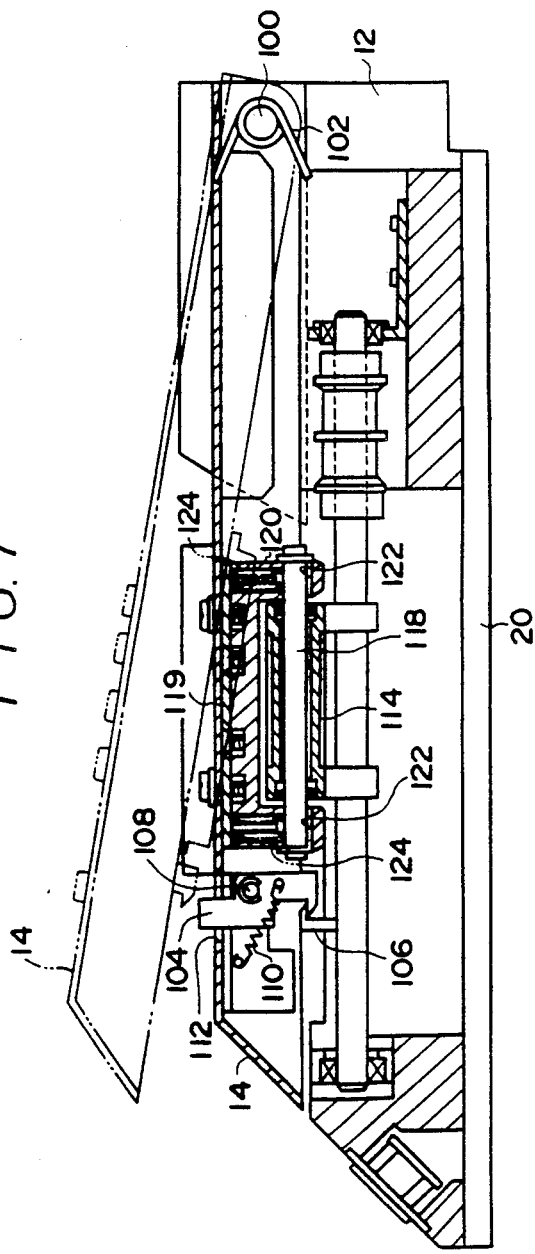
FIG. 7 is a sectional view taken along a line VII—VII of FIG. 4.

The open and close arm 14 shown in FIGS. 1 to 3 has a plane form and an opening 98 formed in it which makes a frame around the optical axis P. One edge of the open and close arm 14, as shown in FIG. 7, has a shaft 100 which is rotatably supported by base member 12. This shaft 100 has a torsion coil spring 102 fitted coaxially which urges the open and close arm 14 in the clockwise direction as viewed in FIG. 7. Near the front edge of the open and close arm 14 is attached a latch 104 which lines up with a hook 106 provided on the base member 12. When connected with the hook 106 it holds the open and close arm 14 in the closed position as shown in FIG. 7 by the full line outline.

The latch 104 is rotatably supported in the open and close arm 14 by a pin 108 and a hook formed at one end portion of the latch 104 is engaged with the hook 106. Between the open and close arm 14 and the latch 104 is connected a tension coil spring 110 to maintain engagement between the latch 104 and the hook 106. The other end of the latch 104 protrudes through an opening 112 in the open and close arm 14. When the other end of the latch 104 is pressed in opposition to the spring 110 force by an operator, the latch 104 is rotated about the pin 108 so that the latch hook slips off the hook 106 and the open and close arm 14 swings up under the urging of the torsion coil spring 102 to a raised position shown by a phantom outline in FIG. 7 or the condition shown in FIG. 2. This arm 14 can be opened wider by manually turning in the clockwise direction shown in FIG. 7.

The hook 106 protrudes through the second mask opening 70 of the lower mask 64 or in the case of the lower mask 64 rotated through 180°, through the opening 68 of the first mask.

As shown in FIG. 5 there are a pair of press rollers 114, 116 attached to the open and close arm 14, and between these and the conveying rollers 22, 24, the negative film 18 is gripped so that at the time of rotation of the conveying rollers 22, 24, the negative film 18 is transported.

The press rollers 114, 116 are respectively rotatably supported by support shafts 118, and, as shown in FIG. 7, the ends of each of the support shafts 118 are accommodated in elongated holes 122 in brackets 120 fixed to the open and close arm 14 by means of a plate 119. These elongated holes 122 enable the support shafts 118 to move in a direction to contact with and separate from the film transport path A. Inside the brackets 120 are compression coil springs 124 fitted over pins that protrude from the plate 119, that press down on the support shafts 118 and consequently press the press rollers 114, 116 against the conveying rollers 22, 24.

Accordingly, with the open and close arm 14 in the condition shown by a full line in FIG. 7, the press rollers 114, 116 press against the conveying rollers 22, 24 due to the urging force from the compression coil springs 124. These press rollers 114, 116 and conveying rollers 22, 24 both have large diameter end portions so that the central section does not contact with the negative film 18 image surface.

Downstream of the open and close arm 14 is attached an L-shaped guide plate 96 to guide the negative film 18.

Upper Mask Holder 16 and Its Related Parts

The upper mask holder 16 can be seen arranged inside the open and close arm 14 when looking from above as shown in FIG. 1. As shown in FIG. 6 it is rotatably supported together with the open and close arm 14 by the shaft 100 so that it can be turned around the shaft 100. However, the upper mask holder 16 may be rotatably supported by the base member 12 through the open and close arm 14, and similarly the open and close arm 14 can be rotatably supported by the base member 12 through the upper mask holder 16.

A mask base 136 is fixed to an end portion of the upper mask holder 16 by a screw 134. In the mask base 136 is formed an opening 137 which is larger than the mask opening, and attached to the mask base 136 is an upper mask 138. The upper mask 138 is attached to the mask base 136 by fitting retaining rings 144 over the projecting ends of the pins 142 which are secured close to the four corners of the mask opening 140 and which pierce the mask base 136. Around the pins 142 between the upper mask 138 and the mask base 136 are fitted compression springs 146 respectively.

By this arrangement the upper mask 138 is always urged towards the film transport path A. The size of the opening 140 is made larger than either of the first mask opening 68 or the second mask opening 70 so that the print size is determined by the size of the first mask opening 68 or the second mask opening 70.

With the open and close arm 14 in the condition shown by the full line in FIG. 7, the upper mask 138 does not contact the lower mask 64, giving the arrangement allowing free conveying of the negative film 18. However if the upper mask holder 16 is rotated from this position in the counter clockwise direction as viewed in FIG. 6, the upper mask 138 is brought into contact with the lower mask 64 so that the negative film 18 is clamped.

This rotation is carried out by a solenoid 148 constituting a drive means attached to the upper mask holder 16 as shown in FIG. 6. An actuator 159 protruding from the solenoid 148 is fixed to the open and close arm 14. Accordingly, when the solenoid 148 is energized to push the actuator 150, the upper mask holder 16 is moved away from the open and close arm 14 and the upper mask 138 is pressed against the lower mask 64.

A torsion coil spring 153 is disposed coaxially with the shaft 100 to lift the upper mask holder 16 to a condition shown in FIG. 6 when the solenoid 148 is not being operated for rotation. Of course, it is possible to use another kind of spring such as a compression coil spring or the like instead of the torsion coil spring 153.

Bar Code Reading Mechanism

As shown in FIGS. 1 to 3, a bar code reading mechanism 230 is arranged upstream of the optical axis P. Beneath the bar code reading mechanism 230 as shown in FIG. 4, a conveying roller 232 which is parallel to the conveying roller 22 is rotatably supported with its ends in bearings 234, 236 provided in the base member 12. Between a pulley 238 attached to the end of the conveying roller 232 and the pulley 38 is wrapped a timing belt 240 to transmit the rotation force. The large diameter portions 232A, 232B provided at intermediate portions of the conveying roller 232 contact with the lower face of the negative film 18.

And, there is a conveying roller 242 to clamp the negative film 18 between it and the conveying roller 232 as shown in FIG. 5. The conveying roller 242 is rotatably supported to a case 244 which is attached to the open and close arm 14, and together with the open and close arm 14 it can be moved up and down. Between and parallel to the conveying rollers 22, 232 is provided a support shaft 246.

Figure 10:
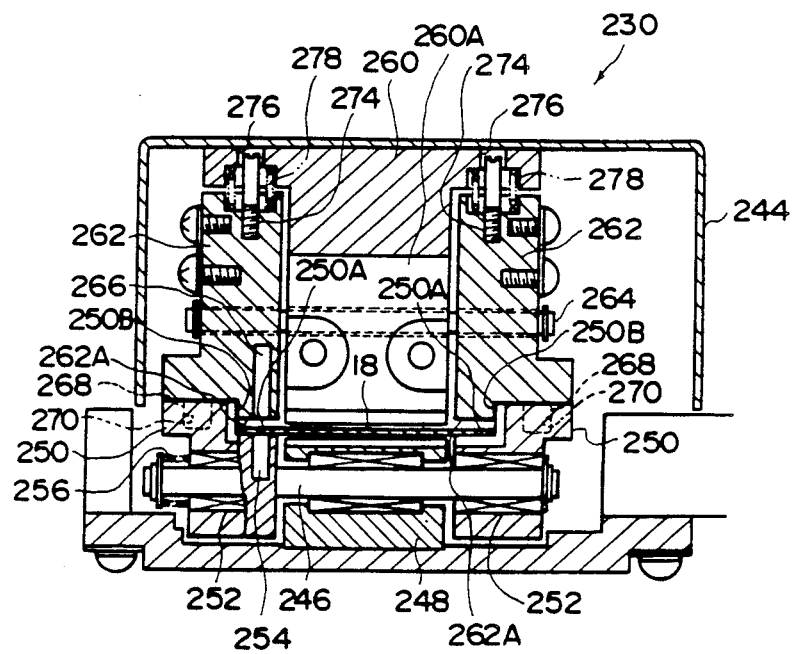
FIG. 10 is a sectional view taken along a line X—X of FIG. 4.

As shown in FIG. 10, a center portion of the support shaft 246 is fixed to a guide block 248 arranged beneath the film transport path A in such a way that both its ends protrude.

Movable blocks 250 are rotatably supported to both the protruded ends of the guide block 248 through slide bearings 252. In one of these movable blocks 250 is attached a light emitting element 254 facing perpendicular to its axis. Further in these movable blocks 250 as shown in FIG. 10, cutout support faces 250A are formed to support the lower face of the negative film 18, and guide faces 250B are formed which are vertically disposed from the edges of the support faces 250A for touching both edges of the negative film 18 as a guide means.

Accordingly, these movable blocks 250 are urged towards the film transport path A by compression coil springs 256 positioned between the ends of the support shaft 246 and the movable blocks 250, so that guide faces 250B press against both edges of the negative film 18.

In a retaining block 260 fixed to the upper face of the case 244 is formed a protruding section 260A protruding towards the film transport path A. On both side sections of the retaining block 260 are arranged follower blocks 262. These follower blocks 262 are pierced by both ends of a support shaft 264 which pierces the central area of the protruding section 260A of the follower block 260. The support shaft 264 is arranged parallel to the support shaft 246, and the follower blocks 262 can move towards and away from the film transport path A in the same way as the movable blocks 250. Each of follower blocks 262 have a light receiving element 266 arranged inside so as to correspond to the light emitting element 254 and by light radiation from the light emitting element 254 the bar code of the negative film 18 is illuminated so that it can be detected.

Further, pressure faces 262A protruding from the lower edge faces of the follower blocks 262 press both side sections near the edges of the negative film 18 located between it and the support face 250A. Also, in each follower block 262, a positioning pin 268 protrudes perpendicular to and down from the side area of the lower face, and this fits into a positioning hole 270 formed in the movable block 250. These positioning pins 268 and positioning holes 270 serve as a linking device to link the light emitting apparatus 252 and the light receiving apparatus 266.

Consequently, when the case 244 is lifted up with the open and close arm 14 to the opened condition, the positioning pin 268 is drawn out of the positioning hole 270 and accordingly the pressure face 262A separates from the support face 250A and frees the negative film 18. However, if the open and close arm 14 is again placed in the set condition and the positioning pin 268 fitted into the positioning hole 270, the follower block 262 follows the movable block 250 and can move in the widthwise direction of the negative film 18.

In a top face of the follower block 262 is fitted a small screw 274. This small screw 274 fits, with a certain amount of clearance, into a receiving hole 276 formed in the retaining block 260. This enables the follower block 262 to move, only by this amount of clearance, in the longitudinal direction of the support shaft 264. Also between this follower block 262 and the retaining block 260 is fitted a coil compression spring 278 and by means of this spring, the pressure face 262A presses both edges sections of the negative film 18 against the support face 250A.

The film carrier 10 is attached to the printing apparatus not shown in the drawings and the optical axis P coincides with the optical axis of the printing apparatus.

When feeding a roll film with the set up of FIG. 1, a tip end of the negative film is sent in the direction of an arrow A by driving motor 50, and is fed between the conveying roller 22 and the press roller 114. In this way the conveying roller 22 and the press roller 114 grippingly convey the end of the film in the direction A so that any image frame can be positioned to coincide with the optical axis P.

In the case of positioning a short negative film 18 cut every 4 to 6 frames, to coincide with the optical axis P, the latch 104 is rotated about the pin 108 to release the hook 106. Then the open and close arm 14 and the upper mask holder 16 shown in FIG. 2 are rotated upwards by urging force from the torsion coil spring 102 and consequently the press rollers 114, 116 and the upper mask 138 in separated from the conveying rollers 22, 24 and the lower mask 64 respectively, and the film transport path A is opened. The operator can then, facing in the direction of an arrow head F in FIG. 2, easily insert the negative film 18 and mount it in position on the film transport path A.

Then if the open and close arm 14 is pushed down, the latch 104 catches on the hook 106 and the film transport path A is again closed with the press rollers 114, 116 and the conveying rollers 22, 24 pressed together. As a result the negative film 18 previously mounted on the conveying rollers 22, 24 becomes gripped.

Accordingly, by the rotation of the motor 50, the conveying rollers transport the negative film 18 by a desired amount so that the image frame is positioned to coincide with the optical axis P. With the negative film 18 in the transport condition the upper mask 138 does not touch the negative film 18. However by energizing the solenoid 148 the upper mask 116 is lowered so that the upper mask 138 clamps the negative film 18 between itself and the lower mask 64 so as to enable an accurate print to be made. Over stroke of the upper mask 16 is absorbed by movement of the upper mask 138 relative to the mask base 136.

When the negative film 18 is being transported by the motor 50, the image is identified by the bar code reading mechanism 230 which reads the bar code recorded on the side of the image 18A of the negative film 18. That is to say, the light emitting element 254 illuminates the bar code of the negative film 18 from under the negative film, and such a print information of the image 18A etc. is detected by detecting the illumination of the bar code with the light receiving element 266 at an upper portion of the negative film 18. In particular, the light emitting element 254 is moved together with the light receiving element 266 by the engagement between the positioning pin 268 and the positioning hole 270, and moves in the negative film 18 widthwise direction, so that the bar code is accurately read. By this procedure, when the image 18A which has had its bar code read comes to the position coinciding with the optical axis P, the print conditions are amended based on the print compensation information.

Also with the image 18A that comes into the vicinity of the optical axes P, it can be determined whether or not this is an appropriate print image since the detector pins 204, 206 slide into the notch 18B in the negative film 18. Moreover the film transport movement amount is controlled, and the image 18A can be accurately aligned with the optical axes P.

Also, since the notch detector pins 204, 206 are located slightly upstream of the optical axes, the negative film 18 is moved a fraction more to stop at the optical axis position so that speedy transport can be effected. And since the notch detector is located slightly upstream of the print stop position, even with the short negative film with only a few frames, notch detection is definite.

When the second mask opening 70 is required to correspond with the optical axis, in the same way the open and close arm 14 is swung upward, and the film transport path A is opened. In this condition if the lower mask 64 is lifted up, then since the positioning pins 86, 88 are withdrawn from the hole 84, the lower mask 64 can be turned through 180° about the guide wall 66 and once again the positioning pins 86, 88 are inserted in the holes 84. As a result the second mask opening 70 corresponds with the optical axis P. Then if the film transport path A is closed by lowering the open and close arm 14 until the latch 104 catches in the hook 106, the negative film 18 insertion can be dealt with. This is done in the same way as with the previously stated operation.

To carry out maintenance, the latch 104 is operated to unfasten the hook 106 so that the open and close arm 14 and the upper mask holder 16 become turnable and separate from the base member 12 as shown in FIG. 2. In this condition, if the open and close arm 14 is lifted up further by an operator so that it is well separated from the base member 12, then replacement of the lower mask 64 and the upper mask 138, and cleaning etc. can be easily carried out. Especially, since the solenoid 148 and the actuator 150 are arranged between the open and close arm 14 and the upper mask holder 16, these drive means do not become an obstruction when the open and close arm 14 and the upper mask holder 16 are opened wide.

In the above preferred embodiment the conveying rollers 22, 24 are made to correspond to the lower side of the negative film 18 being transported, however these conveying rollers 22, 24 can be attached to the open and close arm 14 arranged on the upper side of the negative film 18. In this case, to transmit the rotation force of the motor 50 to the rotatable open and close arm 14, then it becomes necessary to provide an device to absorb the stroke on closing the open and close arm 14, or it becomes necessary to modify the design for attachment of the motor 50 to the open and close arm 14. Also, it is possible to drive the rollers corresponding to both side surfaces of the negative film 18.

Also in the above preferred embodiment, the upper mask holder 16 and the open and close arm 14 are rotatably supported on the same concentric axis, however it goes without saying that another type of support is possible.

Figure 11:
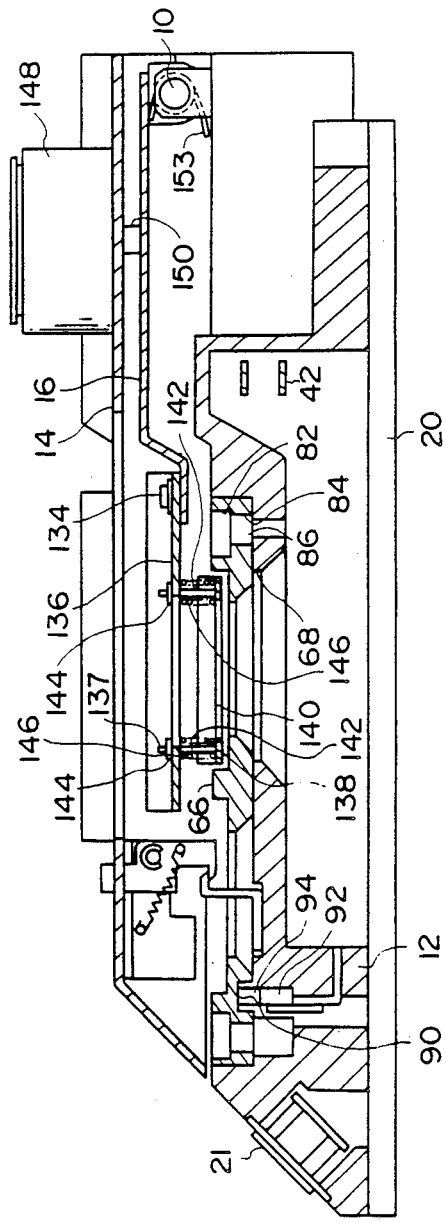
FIG. 11 is a sectional view corresponding to FIG. 6, showing a solenoid drive device of a second embodiment of the present invention.

A second preferred embodiment of the present invention is shown in FIG. 11. The solenoid 148 used in the first embodiment is attached to the open and close arm 14 and the actuator 150 is attached to the upper mask holder 16. Apart from this it is the same as the previous embodiment. Accordingly in the second preferred embodiment, since the solenoid 148 does not load the upper mask holder 16, movement of the upper mask holder 16 can be carried out speedily.

Figure 12:
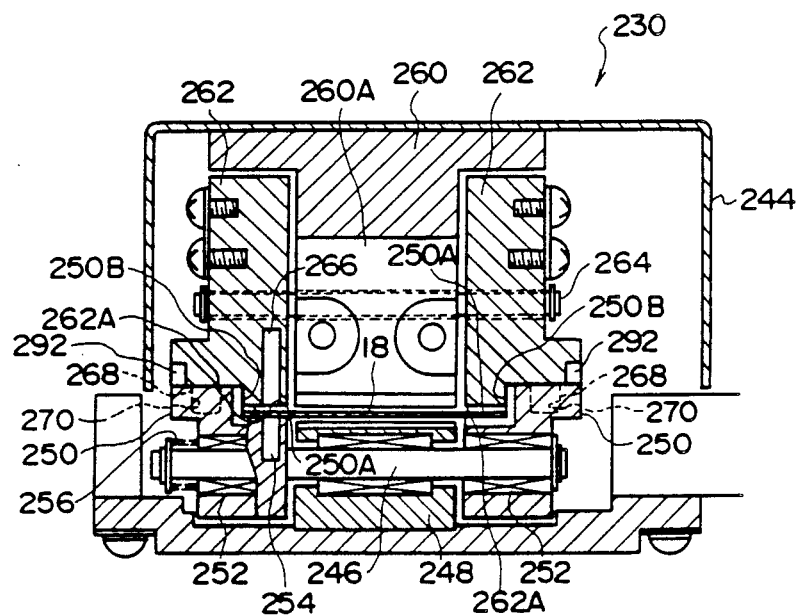
FIG. 12 is a sectional view corresponding to FIG. 10 showing a bar code reading section of a third embodiment of the present invention.

Further a third preferred embodiment is shown in FIG. 12. It is a change of FIG. 10 of the first embodiment. In the third embodiment, the small screw 274 and compression coil spring 278 shown in FIG. 10 are omitted and the lower face of the follower block 262 has a magnet 292 attached at an under surface thereof as a link device.

Consequently the follower block 262 is attracted to the moving block 250 by the magnetic force and by this force the negative film 18 is guided between the support face 250A and the pressure face 262A so that the bar code reading accuracy is maintained. In particular, in this embodiment, even if the clearance (sloppiness) may exist between the positioning pin 268 and the positioning hole 270, the light receiving element 266 accurately follows the light emitting element 254.

What is claimed is:

1. A film carrier for transporting a film which has been marked with a bar code to an optional position comprising;
   (a) a pair of rollers for gripping and transporting a film, said pair of rollers being mutually separatable at the time of insertion of the film between said pair of rollers;
   (b) light emitting means for illuminating said bar code, arranged to face one side surface of said film being transported;
   (c) light receiving means for reading the bar code by light received from the light emitting means, disposed to face the other side surface of said film;
   (d) opening and closing means for separating said light emitting means and said light receiving means to enable said film to be inserted between said light emitting means and said light receiving means at the time of inserting said film between said pair of rollers;
   (e) guide means for causing one of said light emitting means and said light receiving means to follow said bar code; and
   (f) linking means for moving said light emitting means and said light receiving means together in the film widthwise direction at the time of transport of said film, whereby said light emitting means and said light receiving means are mutually aligned and correspond accurately with said bar code.

2. A film carrier according to claim 1, wherein said pair of rollers is constituted such that one of said pair of rollers is separated from the other and said film can be inserted between said rollers, and one of said light emitting means and said light receiving means is moved together with said one roller.

3. A film carrier according to claim 1, wherein one of said pair of rollers is rotatably attached to a fixedly disposed base and the other roller is rotatably attached to an open and close arm rotatably supported by said base, and one of said light emitting means and said light receiving means is connected to said base and the other is disposed to the open and close arm.

4. A film carrier according to claim 1, wherein said guide means is constituted to be pressed against a side edge of said film, and said light emitting means and said light receiving means are caused to follow said bar code.

5. A film carrier according to claim 1, further comprising a resilient member for urging said light emitting means and said light receiving means mutually in the direction for contacting each other.

6. A film carrier according to claim 1, wherein said link means has a positioning pin and a hole for insertion of the positioning pin, and when said light emitting means and said light receiving means are separated by said open and close means, the positioning pin is withdrawn from the hole.

7. A film carrier according to claim 1, wherein one of said light emitting means and said light receiving means is attached to a first movable block which is pressed against an edge of said film, and the other of said light emitting means and said light receiving means is attached to a second movable block moved together with said first movable block in the film widthwise direction.

8. A film carrier according to claim 7, wherein one of said first and second movable blocks has a positioning pin and in the other is formed a hole for taking the positioning pin, and both said movable blocks move unitedly in the widthwise direction of said film.

9. A film carrier according to claim 8, further comprising a resilient member for bringing said first and second movable blocks into close contact with each other.

10. A film carrier according to claim 7, further comprising a magnet for bringing first and second movable blocks into close contact with each other to move said first and second movable blocks together in the widthwise direction of said film.

11. A film carrier according to claim 7, wherein at least one of said first and said second movable blocks is guided in the widthwise direction of said film by a longitudinal axis in relation to the widthwise direction of said film.

12. A film carrier in which a film provided with a bar code is capable of being moved in the widthwise direction of said film to be aligned with an optical axis, comprising:
   (a) a base;
   (b) an open and close arm rotatably supported to said base to form a film transport path for guiding said film between said base and said open and close arm in the longitudinal direction; of said film;
   (c) light emitting means for illuminating said bar code on said film, provided on one of said open and close arm and said base and disposed to face one side surface of said film on said film transport path;
   (d) light receiving means for reading said bar code illuminated by said light emitting means, provided on the other of said open and close arm and said base and disposed to face the other side surface of said film on the film transport path;

(e) link means for linking said light emitting means and said light receiving means together at the time that said open and close arm is closed to said base, and for moving both said light emitting means and said light receiving means to follow an edge position of said film, said link means being provided with a hole and a pin for inserting in said hole for linking said light emitting means and said light receiving means when said open and close arm is closed.

13. A film carrier according to claim 12, further comprising a resilient member for urgingly pressing one of said light emitting means and said light receiving means against the edge of said film.

14. A film carrier according to claim 12, further comprising a resilient member for mutually pressing said light emitting means and said light receiving means together.

15. A film carrier according to claim 13, further comprising a shaft for guiding at least one of said light emitting means and said light receiving means in the widthwise direction of said film.

16. A film carrier according to claim 15, wherein one of said light emitting means and said light receiving means is attached to a movable block guided by said shaft.

17. A film carrier in which a film provided with a bar code is capable of being moved in the widthwise direction of said film to be aligned with an optical axis comprising:
(a) a base;
(b) an open and close arm rotatably supported to said base to form a film transport path for guiding said film between said base and said open and close arm in the longitudinal direction of said film;
(c) light emitting means for illuminating said bar code on said film, provided on one of said open and close arm and said base, and disposed to face one side surface of said film on said film transport path;
(d) light receiving means for reading said bar code illuminated by said light emitting means, provided on the other of said open and close arm and said base, and disposed to face the other side surface of said film on the film transport path;
(e) link means for linking said light emitting means and said light receiving means together at the time that said open and close arm is closed to said base, and for moving both said light emitting means and said light receiving means to follow an edge position of said film, said link means being provided with a magnet for linking said light emitting means and said light receiving means when said open and close arm is closed.

18. A film carrier according to claim 17, further comprising a resilient member for urgingly pressing one of said light emitting means and said light receiving means against the edge of said film.

19. A film carrier according to claim 17, further comprising a resilient member for mutually pressing said light emitting means and said light receiving means together.

20. A film carrier according to claim 18, further comprising a shaft for guiding one of said light emitting means and said light receiving means in the widthwise direction of said film.

* * * * *